(12) United States Patent
Wooldridge

(10) Patent No.: US 7,471,237 B2
(45) Date of Patent: Dec. 30, 2008

(54) BUILT-IN MISSILE RADAR CALIBRATION VERIFICATION

(75) Inventor: John J. Wooldridge, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 11/386,909

(22) Filed: Mar. 22, 2006

(65) Prior Publication Data

US 2008/0297402 A1    Dec. 4, 2008

(51) Int. Cl.
*G01S 7/40* (2006.01)
*G01S 13/00* (2006.01)

(52) U.S. Cl. ............ 342/174; 342/165; 342/175; 342/194

(58) Field of Classification Search ............ 342/165, 342/173–175, 187, 188, 194, 195, 368, 372, 342/384; 343/703
See application file for complete search history.

(56) References Cited

U.S. PATENT DOCUMENTS 5,223,838 A * 6/1993 Tang et al. .................. 342/13
5,682,165 A * 10/1997 Lewis et al. ................ 342/174
5,864,317 A * 1/1999 Boe et al. ................... 342/374
6,346,910 B1   2/2002 Ito

FOREIGN PATENT DOCUMENTS

| EP | 1732163 | | 12/2006 |
|---|---|---|---|
| GB | 2300076 | | 10/1996 |
| GB | 2356493 | A * | 9/1999 |
| GB | 2356493 | | 5/2001 |
| WO | WO 99/52173 | | 10/1999 |

* cited by examiner

*Primary Examiner*—Thomas H. Tarcza
*Assistant Examiner*—Peter M Bythrow
(74) *Attorney, Agent, or Firm*—MacPherson Kwok Chen & Heid LLP; Greg J. Michelson

(57) ABSTRACT

Array antenna calibration verification coupling interrogator and responder with mode-related interrogation signal having a previous calibration phase angle, producing in responder a characteristic interrogation response. Conjugate signal is generated by reversing phase of interrogation signal, producing in responder a characteristic conjugate response. Interrogation and conjugate responses sensed and combined to determine difference characteristic for responder array element. Responder difference characteristic iteratively determined for elements in antenna array representative of present calibration verification state. Present and previous calibration verification states compared, with significant variation adapting array to desired calibration verification state. Verification processor controls interrogator, responders, and signals providing built-in missile RADAR calibration verification.

21 Claims, 5 Drawing Sheets

US 7,471,237 B2

BUILT-IN MISSILE RADAR CALIBRATION VERIFICATION

TECHNICAL FIELD

The present invention relates generally to array antennas, and more particularly, for example, to calibration systems and methods for imaging array antennas.

RELATED ART

Acceptable performance of a phased array antenna is typically achieved by employing suitable calibration techniques to mitigate the non-uniformities in the patterns of the radiating elements. High-resolution applications tend to pose a demanding calibration challenge. Some techniques employ sum-and-difference characterization. Other calibration techniques employ complex analysis of constructive and destructive interferences emanating and detected by a phased array as a whole, or in successive parts. Still others determine both near-field and far-field metrics, which are then used to adjust the antenna pattern. Most techniques employ test or signal equipment external to the array antenna or its application platform. However, techniques that may be suitable in a laboratory or other deliberative setting, or designed for large, one-of-a-kind installations, may be unacceptably cumbersome for volume products managed in a global supply chain, which can demand rapid go, no-go functional testing and calibration verification of a high-resolution, phased-array imaging application. Also, conventional techniques may be unsuitable for real-time calibration verification of a deployed, in-service RADAR imaging application.

Therefore, there is a need for providing high-precision phased arrays applications with rapid, accurate, and built-in functional testing and calibration verification apparatus and methods, suitable for use both in a just-in-time, pre-deployment environment, as well as in use.

SUMMARY

In accordance with embodiments of the present invention, a RADAR calibration verification apparatus and method for a phased array antenna may include a responder selected from an array element of the array antenna; an interrogation signal having a phase angle; an interrogator coupled with the responder by the interrogation signal; and a verification processor coupled to the responder and the interrogator. The verification processor causes the interrogation signal to be coupled with the responder and the interrogator and is adapted to determine a responder characteristic interrogation response to the interrogation signal. The verification processor then can cause the phase angle of the interrogation signal to be rotated by about 180 degrees in phase, thereby generating a conjugate signal, which couples with the responder and the interrogator. The verification processor then can determine a responder characteristic conjugate response to the conjugate signal which, when combined with the characteristic interrogation response produces a responder difference characteristic representative of a present calibration verification state of the array antenna. A memory can store a previous calibration verification state of the array antenna or data representative thereof. The present calibration verification state is compared to the previous calibration verification state and, if a significant variation is found, the array antenna may be adapted to a desired calibration verification state in response to the variation. The interrogator can be a selected array element of the array antenna or a dedicated interrogator distinct from the array elements, which may be a monopole antenna, a dipole antenna, a quadrupole antenna, and the like. The apparatus also may include a transmit processor, which can be configured to cause the array elements to transmit a phased array signal; and a receive processor, which can be configured to cause the array elements to receive a phased array signal. The transmit and receive processors can be coupled to the verification processor, which may direct the respective processor to produce a respective mode-related interrogation signal. A memory coupled to the verification processor can be adapted to store a representation of a calibration verification state of the array. Conveniently, the calibration verification apparatus can be built into a missile, and is suitable for in-flight RADAR phased array calibration verification. The verification processor can be adapted to determine a difference characteristic of the responder to a received interrogation signal having a first polarity, as well as a difference characteristic of the responder to a received interrogation signal having a second polarity.

An embodiment of the present invention can include a method for verifying a calibration verification state of an array antenna having array elements, including a responder and an interrogator, including selecting the interrogator as a transmit interrogator or a receive interrogator, corresponding to a respective array antenna mode, and iteratively determining a representative present calibration verification state for array elements as responders. When one of the respective array elements is selected as the responder, an interrogation signal is generated having a predetermined signal phase value. A phaser corresponding to the respective responder can be commanded to a preselected phase, and the interrogation response signal corresponding to the responder can be sensed. The responder phaser then can be commanded to alter the responder phase state by about $\pi$ radians. The resultant responder signal is the conjugate response signal. Thus, by subtracting the conjugate response signal from the interrogation response signal, a measure of the calibration verification state of the responder can be obtained. This measure can be indicative of a calibration verification state of the array. The method can include iteratively coupling the respective responders and the interrogator with the interrogation signal and determining an interrogation response signal. By commanding the signal phase value corresponding to the responder to be rotated by about n radians, a conjugate response signal is generated, and the respective responder conjugate response can be determined. After iteratively determining the respective responder interrogation response and the respective responder conjugate response, a representative change in the calibration verification state can be determined. The present calibration verification state may be compared with a previous calibration verification state to verify the array calibration verification state or to adapt the array antenna to a desired calibration verification state. The method can determine a representative present calibration verification state of the array antenna disposed in a missile-in-flight, and further adapt the array antenna calibration verification state while in flight, responsive to the representative present calibration verification state of the array antenna, relative to the previous calibration verification state of the array antenna.

DETAILED DESCRIPTION

Figure 1:
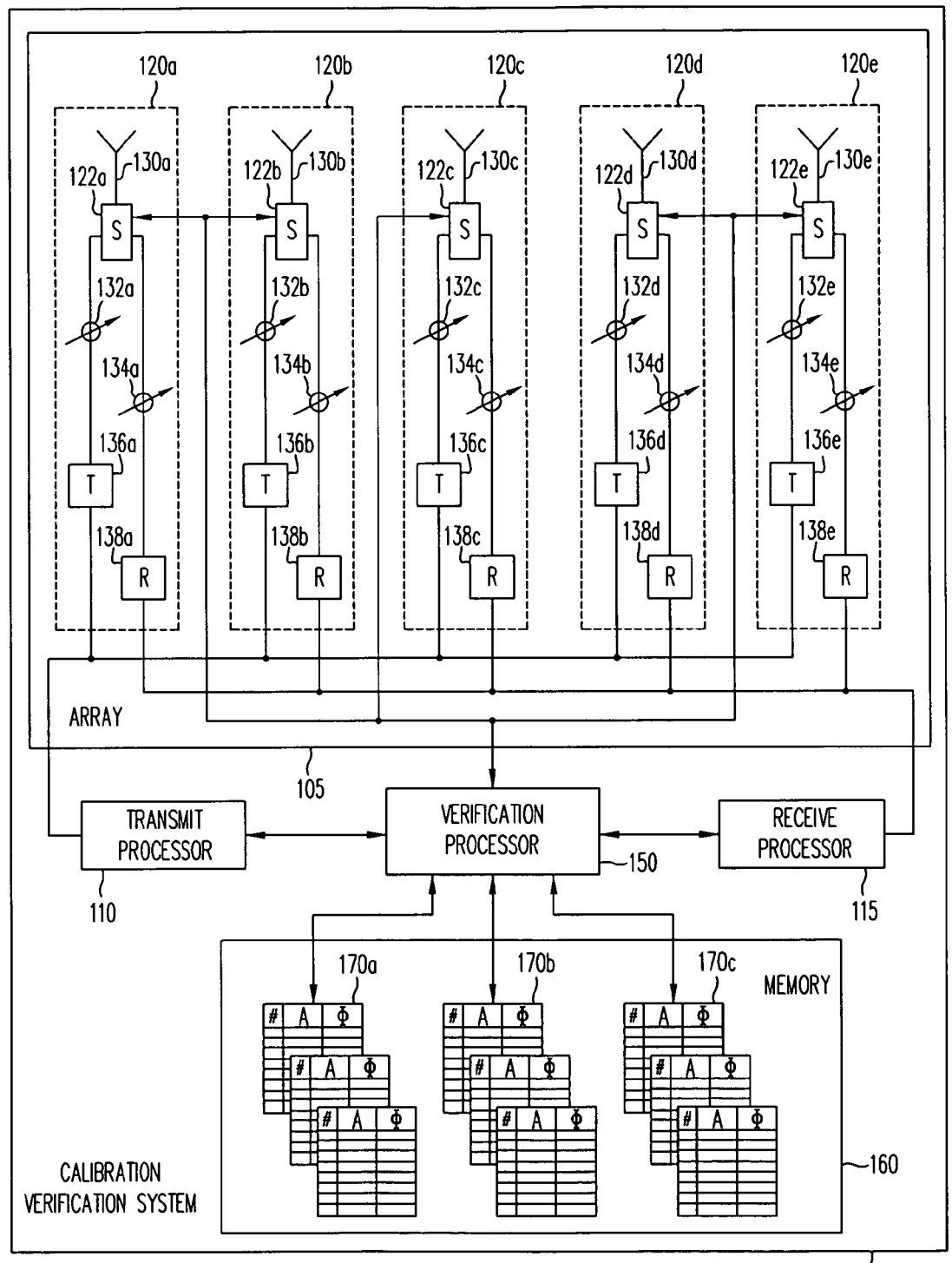
FIG. 1 shows a calibration verification system according to an embodiment of the present invention.

Embodiments of the present invention provide apparatus and methods for rapidly verifying a present calibration verification state of an array antenna, relative to a previous calibration verification state. In general, these apparatus and methods can be built-in to the phased array system, as it is disposed in its application platform. In addition to verifying the present calibration verification state of an array antenna, certain inventive embodiments herein are suitable for testing high-resolution phased-array imaging applications prior to entering service, after deployment, and even while in use. In selected embodiments, a verification processor may verify the present calibration verification state of an array antenna, by selecting a mode, an interrogator, and a responder; by coupling an interrogation signal with the interrogator and the responder; by determining a characteristic interrogation response of the responder to the interrogation signal; by commanding a conjugate responder signal to the responder; by determining a characteristic conjugate response of the responder to the interrogation signal; by combining the characteristic interrogation response and the characteristic conjugate response to generate a respective difference characteristic corresponding to the responder. The respective difference characteristic can be representative of the present calibration verification state of the responder relative to a previous calibration verification state. In addition, the respective difference characteristic can be used to adapt the array antenna to a new desired calibration verification state. Moreover, one or more of the characteristic interrogation response, the characteristic conjugate response, the respective difference characteristic, the previous calibration verification state, and the present calibration verification state can be stored to subsequently provide diagnostic information, product characterization data, and the like. Beneficially, the apparatus and methods herein can be applied to a variety of array antenna structures including planar and conformal arrays, as well as to phased array antennas, including those employed with synthetic aperture imaging systems, homing systems, and operable combinations thereof. Turning to FIG. 1, an embodiment of calibration verification system 100 according to the present invention is depicted to include array 105, transmit processor 110, and receive processor 115. Array 105 is capable of one or both of transmitting and receiving. Array elements 120a-120e are exemplary constituents of array 105, and are coupled to transmit processor 110 and receive processor 115. Array element 120a can be formed from antenna element 130a, transmit channel phaser 132a, transmit module 136a, receive channel phaser 134a, and receive module 138a. Array elements 120b-120e can be substantially the same as array element 120a, in structure, function, or both. A person having ordinary skill in the art would know how to make and use array 105, respective array elements 120a-120e, and processors 110, 115; as well as appreciate that array 105, respective array elements 120a-120e, and processors 110, 115 are representative of myriad array devices suitable for configuration within the scope of the present invention. For clarity, a separate phaser is shown in each of the transmit and the receive paths. For economical reasons, the phaser could be a single phaser switched into either the receive path or the transmit path. Exemplary array configurations include, without limitation, linear, planar, and conformal arrays, having geometries that are rectilinear, curvilinear, and a combination thereof. In accordance with selected inventive embodiments herein, system 100 can further include verification processor 150 coupled to one or both of transmit processor 110 and receive processor 115'. It may be desirable to control transmit phasers 132a-132e and receive phasers 134a-134e directly by verification processor 150, as well as indirectly by verification processor 150 acting through respective processors 110, 115, for example, using well-known feedback mechanisms. Built-in test (BIT) switches 122a-122e may be components of respective array elements 120a-120e generally adapted to facilitate calibration verification that can be coupled to verification processor 150.

Under the control of verification processor 150, BIT switches 122a-122e may operate to configure one of respective array elements 120a-120e as an interrogator array element or, simply, an interrogator, and configure others of respective array elements 120a-120e as responders or, simply, responders. BIT switches 122a-122e also may operate to configure the interrogator as a transmit-mode interrogator or a receive-mode interrogator. Once configured, verification processor 150 can actuate the interrogator, can sense a characteristic response by the responder, and can determine a respective difference characteristic of the responder. This difference characteristic may be representative of a present calibration verification state of the respective array elements 120a-120e, which may be compared to a previous calibration verification state to verify the calibration of the array. Responsive to the respective difference characteristic for one or more of respective array element 120a-120e, verification processor 150 may adapt array 105 to a desired calibration verification state, which may be different from the present calibration verification state. Although the interrogator of array 105 may be configured from a selected individual element, or subarray of elements, of respective array elements 120a-120e, a dedicated interrogator such as a monopole antenna, a dipole antenna, a quadrupole antenna, and the like, distinct from respective array elements 120a-120e may be disposed in array 105 as an interrogator.

Verification processor 150 can cause an interrogation signal to couple the interrogator with respective responder 120a-120e. In general, with array 105 in a receive mode, an interrogator is "coupled with" respective responder 120a-120e by transmitting the interrogation signal to respective responder 120a-120e. Similarly, with array 105 in a transmit mode, an interrogator is "coupled with" respective responder 120a-120e by receiving the interrogation signal from respective responder 120a-120e. Verification processor 150 can sense a characteristic interrogation response of responder 120a when coupled with the interrogation signal.

Typically, each of the interrogation signal and the characteristic interrogation response signal can take the form of a vector value, e.g., $\overline{X}$, which may be described by an amplitude value, e.g., X, and a corresponding phase angle value, e.g., $\sphericalangle\Phi$. In more compact notation:

$$\overline{X} \to X\sphericalangle\Phi$$

It is desirable that present inventive embodiments of processor 150 "blink" a temporal portion of the characteristic interrogation response signal corresponding to a respective responder, thereby producing a characteristic conjugate response signal corresponding to that respective responder. To blink a signal, as used herein, is to generate, or cause to be generated, a conjugate signal. A conjugate signal is one substantially reversed in phase relative to the corresponding interrogation response signal, i.e., rotated in phase $\sphericalangle\Phi$ by about $\pi$ radians (about 180°). That is, $$\sphericalangle\Phi^* = \sphericalangle\Phi \pm \pi \text{ radians (or } \pm 180°)$$

In keeping with the interrogation signal notation, a corresponding exemplary responder conjugate signal may be represented as:

$$\overline{X}^* \to \sphericalangle\Phi.$$

One skilled in the art of phased arrays would recognize that processor 150 may blink the interrogation response signal by actuating an array element phaser associated with the respective responder, for which the characteristic interrogation response is being determined. A characteristic interrogation response conjugate signal can be formed in the transmit mode or in the receive mode by reversing the signal phase controlled by phaser 132a-132e, 134a-134e of the respective responder 120a-120e. Verification processor 150 can determine a characteristic conjugate response of responder 120a to the conjugate signal. In general, verification processor 150 causes an interrogator signal to couple the interrogator with the responder, whereby a interrogation response signal is generated; determines the characteristic interrogation response of the responder; generates a conjugate signal corresponding to phase shift of about $\pi$ radians of interrogation response signal, and determines the characteristic conjugate response of the responder.

Extending a previous example, in which the receive calibration verification state of respective array element 120a is being characterized, processor 150 can activate BIT switch 122c to configure array element 120c as a receive-mode interrogator (i.e., a transmitter), and BIT switch 122a to configure array element 120a as a responder. Processor 150 may energize interrogator 120c to couple an interrogator signal with responder 120a, and can actuate receive channel phaser 134a such that the signal phase angle of the receive interrogation signal is commanded to a previous calibration verification phase angle, $\Phi_{VER}$, for responder 120a in the receive mode. Processor 150 then can determine the characteristic interrogation response of responder 120a in the receive mode. Then, processor 150 can actuate receive channel phaser 134a such that the signal phase angle of the interrogation response signal is rotated in phase by $\pi$ radians (180°), i.e., $\sphericalangle\Phi_{VER}$, thus generating the corresponding conjugate signal. Processor 150 can determine the characteristic conjugate response of responder 120a with array 105 in a receive mode.

Likewise, in the example in which the transmit calibration verification state of respective responder 120a is being characterized, processor 150 can activate BIT switch 122c to configure array element 120c as a transmit-mode interrogator (i.e., a receiver), and BIT switch 122a to configure array element 120a as a transmit responder. Processor 150 may energize responder 120a to couple an interrogator signal with interrogator 120c, and can actuate transmit channel phaser 132a such that the signal phase angle of the transmit interrogation signal is set to a previous calibration verification phase angle, $\sphericalangle\Phi_{VER}$, for responder 120a in the transmit mode. Processor 150 then can determine the characteristic interrogation response of responder 120a in the transmit mode, and can actuate transmit channel phaser 132a such that the signal phase angle of the interrogation response signal is rotated in phase by $\pi$ radians (or 180°) from the previous calibration verification phase angle, i.e., $\sphericalangle\Phi^*_{VER}$, thus generating the corresponding conjugate signal. Processor 150 can determine the characteristic conjugate response of transmit responder 120a with array 105 in a transmit mode.

By combining the mode-related responder characteristic interrogation response and the characteristic conjugate response, verification processor 150 can generate a respective difference characteristic $\Psi$ corresponding to the present calibration verification state of the respective responder, e.g., array element 120a, relative to a previous calibration verification state. Advantageously, selected embodiments of the present invention combine characteristic interrogation response and the characteristic conjugate response using simple vector subtraction. Thus, where characteristic interrogation response, $\overline{A}$, is constituted of signal amplitude A having a signal phase angle of $\sphericalangle\Phi_{VER}$, or $$\overline{A} \to A \sphericalangle\Phi_{VER},$$

A corresponding characteristic conjugate response, $\overline{A}^*$, is constituted of signal amplitude A having a signal phase angle of $\sphericalangle\Phi^*_{VER}$ That is:

$$\overline{A}^* \to A \sphericalangle\Phi^*_{VER}$$

By using simple vector subtraction to combine a characteristic interrogation response and the corresponding characteristic conjugate response, a new coupling vector can be determined which has an amplitude 2A and the same phase as $\overline{A}$, i.e., $\sphericalangle\phi_{VER}$. This new vector when compared to a previous coupling vector will yield a difference characteristic $\Psi$, which may be a vector value, having an amplitude difference characteristic, Z, and a phase angle difference characteristic, $\sphericalangle\Delta$, or $$\Psi = Z \sphericalangle\Delta$$

Respective difference characteristic $\Psi$ can be representative of a calibration verification state of a respective responder 120a-120e for a given mode (transmit, receive) of array 105 operation.

In this manner, the present calibration verification state of each or selected respective responder 120a-120e of array 105 may be obtained, and it may be advantageous to proceed iteratively to determine the respective calibration verification states of other respective array elements 120b-120e, for a given operational mode (i.e., receive, transmit). It can be beneficial to iteratively determine the present calibration verification state of array 105 relative to a previous calibration verification state in a receive mode of operation, followed by iteratively verifying the present calibration verification state of array 105 relative to a previous calibration verification state in a transmit mode of operation. In addition, where array 105 is configured to receive signals oriented with plural polarizations, it may be beneficial to iteratively determine the present calibration verification state of array 105 relative to a previous calibration verification state in a receive mode of operation for a first signal polarization, followed by iteratively determining the present calibration verification state of array 105 relative to a previous calibration verification state in a receive mode of operation for a first signal polarization and a second signal polarization.

In the example where a receive calibration verification state of array 105 is being determined, where array element 120c can temporarily be used as an interrogator, and after determining the calibration verification state of responder 120a, it may be advantageous to proceed iteratively to determine the receive calibration verification states of respective array elements 120b, 120d, and 120e. To determine the receive calibration verification state of respective array element 120c, it may be desirable to configure a second selected array element, such as array element 120b, as an interrogator to couple the interrogation signal with array element 120c as the responder.

Similarly, where the transmit calibration verification state of array 105 is being verified, where array element 120c is used as an interrogator, and after determining the calibration verification state of responder 120a, it may be advantageous to proceed iteratively to determine the transmit calibration verification states of respective array elements 120b, 120d, and 120e. To verify the transmit calibration verification state of respective array element 120c, it may be desirable to configure a second selected array element, such as array element 120b, as an interrogator to couple the interrogation signal with responder 120c. The foregoing alternative interrogation techniques may be replaced by disposing in array 105 a distinct interrogator antenna component, such as a monopole antenna, a dipole antenna, a quadrupole antenna, and the like. By evaluating present amplitude and signal phase angle calibration verification characteristics relative to previous amplitude and signal phase angle calibration verification characteristics, processor 150 can determine whether the present calibration verification state of array element 120a-120e varies from a previous calibration verification state, and whether the variation between the present and previous states is significant, undesirable, or both. Where the variation between calibration verification states warrants a correction, array 105 may be adapted to a desirable calibration verification state using the respective difference characteristics of one or more respective array elements 120a-120e. Not all variations between previous and present calibration verification states may warrant adapting one or more of array element 120a-120e. Processor 150 also may elect to take no adaptive action to array 105, or to defer adaptation to a desirable calibration verification state until a later time, and calibration verification phase angle, $\sphericalangle\Phi_{VER}$, may be left unchanged.

Typically, the calibration verification state of antenna array 105 can be represented by a matrix of respective calibration verification state values for each of the n responders 120a-120e. The respective calibration verification state value for each array element may be a respective characteristic interrogation response $\overline{A}$, a respective characteristic conjugate response $\overline{A}^*$, a respective difference characteristic $\Psi$, or subsets, derivations, or combinations thereof. For example, for each of n array elements 120a-120e that can be represented by a respective difference characteristic vector $\Psi_i$, the present calibration verification state $\Theta_n$ of the $n^{th}$ element of array 105, at time k may be symbolized by $$\Theta_{n,k} = \begin{pmatrix} \Psi_{1,k} \\ \vdots \\ \Psi_{n,k} \end{pmatrix}$$

or equivalently $$\Theta_{n,k} = \begin{pmatrix} z_{1,k} \sphericalangle \Delta_{1,k} \\ \vdots \\ z_{n,k} \sphericalangle \Delta_{n,k} \end{pmatrix},$$

where index n represents the array element index and index k represents the time index of present calibration verification state $\Theta$. Again, for simplicity of exposition, element index n will be implicit hereafter, although time index k will remain explicit. Because it is advantageous to compare the present calibration verification state of array elements 120a-120e with a previous calibration verification state, calibration verification state $\Theta_k$ will be representative of a present calibration verification state of a phased array antenna, such as array 105, and state $\Theta_{k-1}$ will be representative of a previous calibration verification state.

Thus, processor 150 can verify present calibration verification state $\Theta_k$ relative to previous calibration verification state $\Theta_{k-1}$ and, further, determine whether it would be desirable to adapt array 105 to an adapted desired calibration state $\Theta_s$ by adapting at least one of amplitude X and a phase angle $\sphericalangle\Phi$ of respective array elements 120a-120e. In certain embodiments of the present invention, the value of present calibration verification state $\Theta_k$ may indicate that an array adaptation to a desired calibration state $\Lambda_s$ may be unwarranted, such that the existing previous calibration verification state is sufficiently representative of the present calibration verification state of array 105; no change may be made to the value of previous calibration verification state $\Theta_{k-1}$ for a subsequent iteration of array 105 calibration verification. However, after comparison of calibration verification states $\Theta_k$ and $\Theta_{k-1}$, processor 150 may determine that it is desirable to adapt at least one of amplitude X and a phase angle $\sphericalangle\Phi$ of at least one of respective array elements 120a-120e. Verification processor 150 may cause array 105 to be adapted in accordance with desired calibration state $\Lambda_s$, and may set adapted desired calibration state $\Lambda_s$ as being representative of previous calibration verification state $\Theta_{k-1}$ for a subsequent iteration of array 105 calibration verification. Also, it may be desirable to set present calibration verification state $\Theta_k$ to be previous calibration verification state $\Theta_{k-1}$ after an iteration of calibration verification for array 105.

System 100 also can include memory element 160 in which exemplary data structures, e.g., calibration tables 170a-170c, may store data representative of previous calibration verification state $\Theta_{k-1}$. State $\Theta_{k-1}$ may include previous amplitude and signal phase angle calibration characteristics, for each of array elements 120a-120e. For example, calibration table 170a may store data representative of previous calibration verification state $\Theta_{k-1}$ in a transmit mode of operation of array 105; calibration tables 170b may store data representative of previous calibration verification state $\Theta_{k-1}$ in a receive mode of operation of array 105 at a first signal polarization orientation; and calibration tables 170c may store data representative of previous calibration verification state $\Theta_{k-1}$ in a receive mode of operation of array 105 at a second signal polarization orientation. Processor 150 can store present calibration verification state data, e.g., respective array element amplitude and phase angle characteristics, in memory 160 which subsequently can used as previous calibration verification state data during a subsequent iteration of array 105 calibration verification state determination.

Typically, the transmit calibration verification state of array 105 is determined with more than one array element energized. Thus, the response signals of a particular responder, e.g., the characteristic interrogation response and the characteristic conjugate response, may be an ensemble of constituent responses corresponding to other array elements arising, for example, through mutual coupling or, perhaps, through beam pointing errors. Although mutual coupling is often considered generally undesirable during in-service operation of a phased array, the inventive methods and apparatus herein can make use of mutually coupled signals to facilitate phased array calibration verification and can mitigate unwanted portions of signals mutually-coupled to a responder array element.

Regarding methods for verifying the calibration verification state of array 105, and for adapting or updating a current calibration verification state of array 105 in accordance with desired calibration state $A_s$, array 105 can initially be calibrated by conventional methods. For example, each array element can undergo traditional transmit and receive boresighting using far-field or near-field calibration techniques to generate a plane-wave propagating in the boresight direction. Conveniently, a conjugate signal may be used to derive data corresponding to the initial boresight phase angles on each element. These boresight phase angles can describe the initial boresight state ($B_0$), which represents the initial boresight configuration. However determined, boresight state $B_0$ may be stored in a data structure, for example, one of calibration tables 170a-170c in memory element 160.

Next, it is desirable to perform an initial coupling calibration soon after the initial boresighting calibration is completed, such that the boresight configuration during the initial coupling calibration is substantially identical to the initial boresight configuration. In general, the initial coupling calibration establishes an initial coupling calibration state ($C_0$) reflecting the nature of the mutual coupling between and among array elements, relative to the initial boresight configuration. The initial coupling calibration state ($C_0$) may be stored in one of calibration tables 170a-170c in memory element 160, as well. Initial boresight state ($B_0$) and initial calibration state ($C_0$) can be characterized as respective initial reference states of array 105.

FIGS. 2A-2E broadly illustrate an advantageous use of present inventive embodiments of apparatus and methods herein, whereby mutually coupled signals may induce in respective array elements induce a characteristic interrogation response and a corresponding characteristic conjugate response. According to embodiments of the present invention, the conjugate signal calibration verification method used herein can identify changes in the calibration signal values by measuring the mutual coupling values between successive calibration verification operations, and may correct a boresight calibration of the array responsive to these detected changes.

In general, FIGS. 2A-2E illustrate calibration verification updating after initial boresight state $B_0$ and initial coupling calibration state $C_0$ have been obtained and stored. Initial coupling calibration state $C_0$ can be initially designated as reference coupling state $\overline{C}_{cal}$ for the purposes of array calibration verification. For the purposes herein, $\angle\Phi_{CAL}$ is representative of phase values obtained during initial calibration, when initial calibration state ($C_0$) is being determined; and $\angle\Phi_{VER}$ is representative of phase values obtained during calibration verification. In general, phase angles values $\angle\Phi_{VER}$ for a given calibration verification operation may have the following relationship with initial phase calibration values $\angle\Phi_{CAL}$:

$$\angle\Phi_{VER} = \angle\Phi_{CAL} + \Delta_C,$$

where $\Delta_C$ is representative of mutual coupling-induced phase deviations in the array elements after the initial calibration state ($C_0$) has been determined. Such as relationship also may exist between current calibration verification phase angles and previous calibration verification phase angles:

$$\angle\Phi_{VER}(t) = \angle\Phi_{VER}(t-1) + \Delta_C(t)$$

where $\Delta_C(t)$ is representative of mutual coupling-induced phase changes in the array elements that remain substantially constant over an interval between subsequent calibration verification operations.

To facilitate understanding, FIGS. 2A-2E make reference to exemplary array 105 in FIG. 1, and array elements thereof, configured in a transmit mode of operation. It is to be understood that receive functionality also is within the scope of the present invention, including received signals oriented with plural signal polarizations.

Figure 2C:
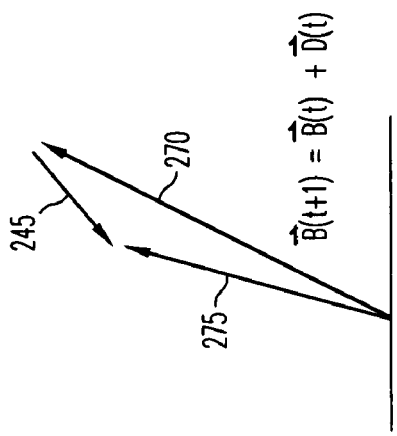
FIG. 2C depicts a difference characteristic according to embodiments of the present invention.
Figure 2E:
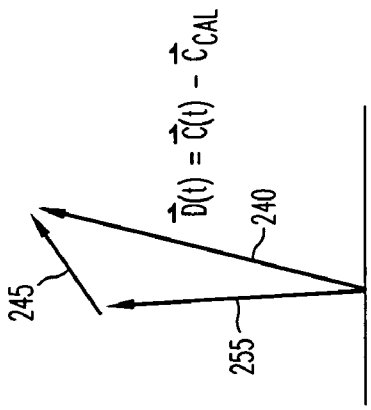
FIG. 2E shows the difference between two responder measurements being used to change the array calibration.
Figure 2B:
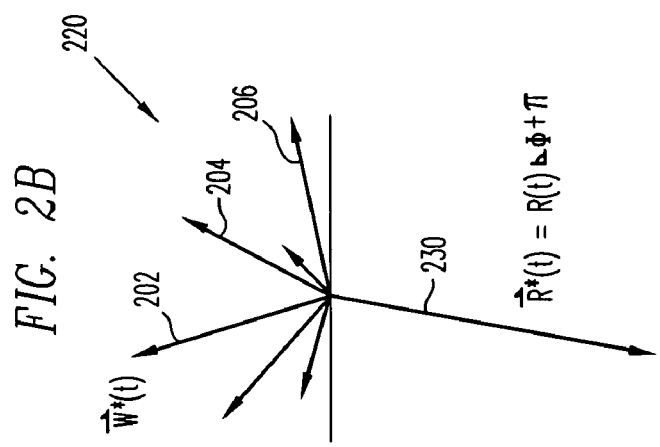
FIG. 2B depicts an ensemble signal with a characteristic conjugate response according to embodiments of the present invention.
Figure 2A:
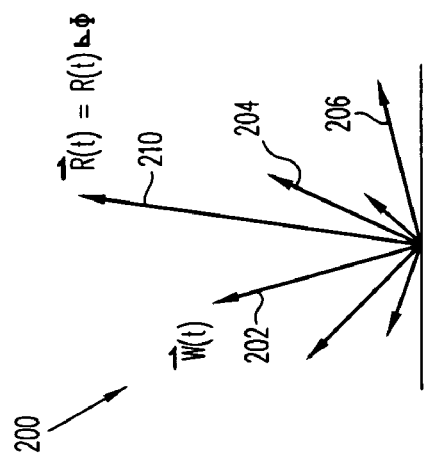
FIG. 2A depicts an ensemble signal with a characteristic interrogation response according to embodiments of the present invention.

FIGS. 2A-2B represent respective characteristic response signals generally embedded in respective response ensembles of a responder in a phased array, similar to responder 120a in array 105 of FIG. 1. For clarity, each of interrogation response ensemble $\overline{W}(t)$ (generally at 200) and conjugate response ensemble $\overline{W}^*(t)$ (generally at 220) may be treated as being a single signal, although each may represent combined plural signals mutually coupled and having respective amplitudes and phase angles.

Accordingly, in FIG. 2A, interrogation response ensemble $\overline{W}(t)$ 200 represents an interrogation response to an interrogation signal by a responder, such as element 120a, when coupled with interrogator 120c. Ensemble $\overline{W}(t)$ 200 can be a composite of numerous signals, including characteristic interrogation response $\overline{R}(t)$ 210, a signal of interest, as well as noise waveforms, exemplified by interference signals 202, 204, 206. Response $\overline{R}(t)$ 210 is depicted having amplitude of C and phase angle of $\angle\Phi$ radians. Interference signals 202, 204, 206 can be evoked from neighboring array elements, e.g., array elements 120b, 120d, 120e, for example, through mutual coupling. It can be beneficial to determine a difference characteristic evoked by the interrogation signal in a respective responder array element by measuring interrogation response $\overline{R}(t)$ 210, for the difference characteristic may be indicative of the calibration verification state of array 105. However, one or both of the response amplitude R and the response phase angle $\angle\Phi$ of characteristic interrogation response $\overline{R}(t)$ 210 can be corrupted through the influence of the respective amplitude and phase values of each of interference signals 202, 204, 206. To improve the accuracy of calibration verification of array 105, it is desirable to mitigate the unwanted effects that interference signals 202, 204, 206 may impose on interrogation response $\overline{R}(t)$ 210.

FIG. 2B illustrates conjugate response ensemble $\overline{W}^*(t)$ 220, which includes characteristic conjugate response $\overline{R}^*(t)$ 230. Conjugate ensemble $\overline{W}^*(t)$ 220 can be formed when processor 150 causes phaser 134a to "blink" responder 120a, i.e., to shift the phase angle $\angle\Phi$ of $\overline{R}(t)$ 210 by about $\pi$ radians, such that $\overline{R}^*(t)$ 230 is a signal having an amplitude of about R with a phase of about $\angle\Phi+\pi$. Although the "blink" of responder 120a can transform characteristic interrogation response $\overline{R}(t)$ 210 into characteristic conjugate response $\overline{R}^*(t)$ 230, interference signals 202, 204, 206 generally do not experience significant phase alteration. Thus, the interference signals 202, 204, 206 of ensemble $\overline{W}^*(t)$ 220 tend to remain unchanged, for the most part.

FIG. 2C illustrates advantages of determining respective difference characteristic $\overline{E}(t)$ 250, for example, by combining ensemble $\overline{W}(t)$ 200 and conjugate ensemble $\overline{W}^*(t)$ 220 through an implementation using simple vector subtraction. In this way, deleterious effects of interference signals 202, 204, 206 upon the calibration verification of array 105 may be mitigated. Also, FIG. 2C illustrates that a result of "subtracting" conjugate ensemble $\overline{W}^*(t)$ 220 from ensemble $\overline{W}(t)$ 200 is the generation of respective difference characteristic $\overline{E}(t)$ 250, having a signal amplitude of about 2R and a phase angle of about $\sphericalangle\Phi$ radians, thereby amplifying the signal of interest, i.e., response $\overline{R}(t)$ 210, relative to residual coupled and non-coupled signal components. Such augmentation can be advantageous in environments and applications demonstrating diminished signal-to-noise margins. Respective difference characteristic $\overline{E}(t)$ 250 can be indicative of the calibration verification state of array 105, and may be used to induce verification processor 150 to adapt array 105 in accordance with desired calibration state $\Lambda_s$. Alternatively, current calibration verification state $\overline{C}(t)$ 240 may be derived from respective difference characteristic $\overline{E}(t)$ 250, such as by scaling or by applying to $\overline{E}(t)$ 250 a predetermined transfer function, which may be an adaptive transfer function. Difference characteristic $\overline{E}(t)$ 250 can be representative of a current calibration state corresponding to a current operational mode, such as transmit calibration state, which may be compared with a difference characteristic from a previous transmit calibration state. It may be desirable to iteratively form a matrix populated with a respective difference characteristic $\overline{E}(t)$ 250 for each of array elements 120a-120d in the operational mode under test.

Figure 2D:
FIG. 2D depicts comparison of a present difference characteristic with a previous difference characteristic according to embodiments of the present invention.

FIG. 2D illustrates a determination of calibration deviation $\overline{D}(t)$ 245 of current calibration verification state $\overline{C}(t)$ 240 from reference coupling state $\overline{C}_{cal}$ 255:

$$\overline{D}(t)=\overline{C}(t)-\overline{C}_{cal}$$

In general, reference coupling state $\overline{C}_{cal}$ 255 can be representative of a selected previous coupling calibration verification state of array 105, which may be initial coupling calibration state $C_0$, or may be a selected subsequent coupling calibration verification state from a previous calibration verification iteration. In general, calibration deviation $\overline{D}(t)$ 245 represents a change of the calibration verification state of array 105; however, it may be expedient to adapt array 105 in accordance with desired calibration state $\Lambda_s$ when calibration deviation $\overline{D}(t)$ 245 exceeds a predetermined error threshold, that is, for calibration errors that are deemed "significant." Ostensibly, the adaptation of an array is directed to improving array imaging resolution and to other array qualities directed to a successful end to the mission objectives of the array application platform. A person having ordinary skill in the art recognizes that adapting a calibration verification state of an array, such as array 105, usually imposes a cost upon the application platform hosting array 105, for example, in terms of adaptation time, processing resources, power reserves, and jeopardy to mission objectives, to name a few. That skilled artisan also would be capable of pragmatically determining a predetermined error threshold pertaining to a particular implementation of array 105.

Therefore, where calibration deviation $\overline{D}(t)$ 245 is less than a predetermined error threshold, it may be desirable to not adapt array 105 and to leave reference coupling state $\overline{C}_{cal}$ 255 substantially unchanged. On the other hand, where calibration deviation $\overline{D}(t)$ 245 triggers an calibration error response by meeting or exceeding a predetermined error threshold, it may be desirable to adapt array 105 in accordance with desired calibration state $\Lambda_s$ and to update reference coupling state $\overline{C}_{cal}$ 250 with current calibration verification state $\overline{C}(t)$ 240; that is, $\overline{C}_{cal} \leftarrow \overline{C}(t)$.

Calibration deviation $\overline{D}(t)$ 245 typically has calibration deviation amplitude D and calibration deviation phase angle $\Upsilon$. During an interim between successive calibration verification iterations for array 105, the development of a calibration deviation, in one or both of amplitude D or phase angle $\Upsilon$, may represent a change in the array look direction, for example, from physical modification or damage to one or both of responder 120a and array 105, for example, from thermal excursions, and changes in the electronic response of the elements in the array. Indeed, a significant increase or other anomaly identified by calibration deviation $\overline{D}(t)$ 245, may indicate an array element failure or otherwise serve to diagnose a fault in array 105. Difference characteristic $\overline{E}(t)$ 250 and calibration deviation $\overline{D}(t)$ 245 may be used to adapt array 105 in mitigation of such a fault. Persons of ordinary skill in the phased array art are aware of well-known techniques that may be used to functionally adapt array antennas in the face of a known alteration or diminution of array element functionality.

FIG. 2E broadly depicts a generalized technique for adapting array 105 in accordance with desired calibration state $\Lambda_s$, for example, by adapting a boresight state $\overline{B}$ of array 105. In an instance in which the nature of calibration deviation $\overline{D}(t)$ 245 triggers a calibration error response, it may be desirable to adapting array 105 by modifying current boresight state $\overline{B}(t)$ 270 responsive to calibration deviation $\overline{D}(t)$ 245. For example:

$$\overline{B}(t+1)=\overline{B}(t)+\overline{D}(t),$$

where $\overline{B}(t+1)$ represents an updated boresight state which can be designated to be used as a current boresight state during a subsequent iteration of inventive array calibration verification embodiments herein. Although the examples illustrating the foregoing principles, including respective difference characteristic $\overline{E}(t)$, determining calibration deviation $\overline{D}(t)$ 245 modifying current boresight state $\overline{B}(t)$ 270, are described in terms of simple linear functions of matrices, vectors, and scalars, it must be understood that a person having ordinary skill in the arts of array antenna and array signal processing would be well versed in the myriad of techniques and methods that foreseeably may be used to achieve calibration verification employing conjugate response techniques, including non-linear techniques and combinations of linear and non-linear functions and processes.

Figure 3:
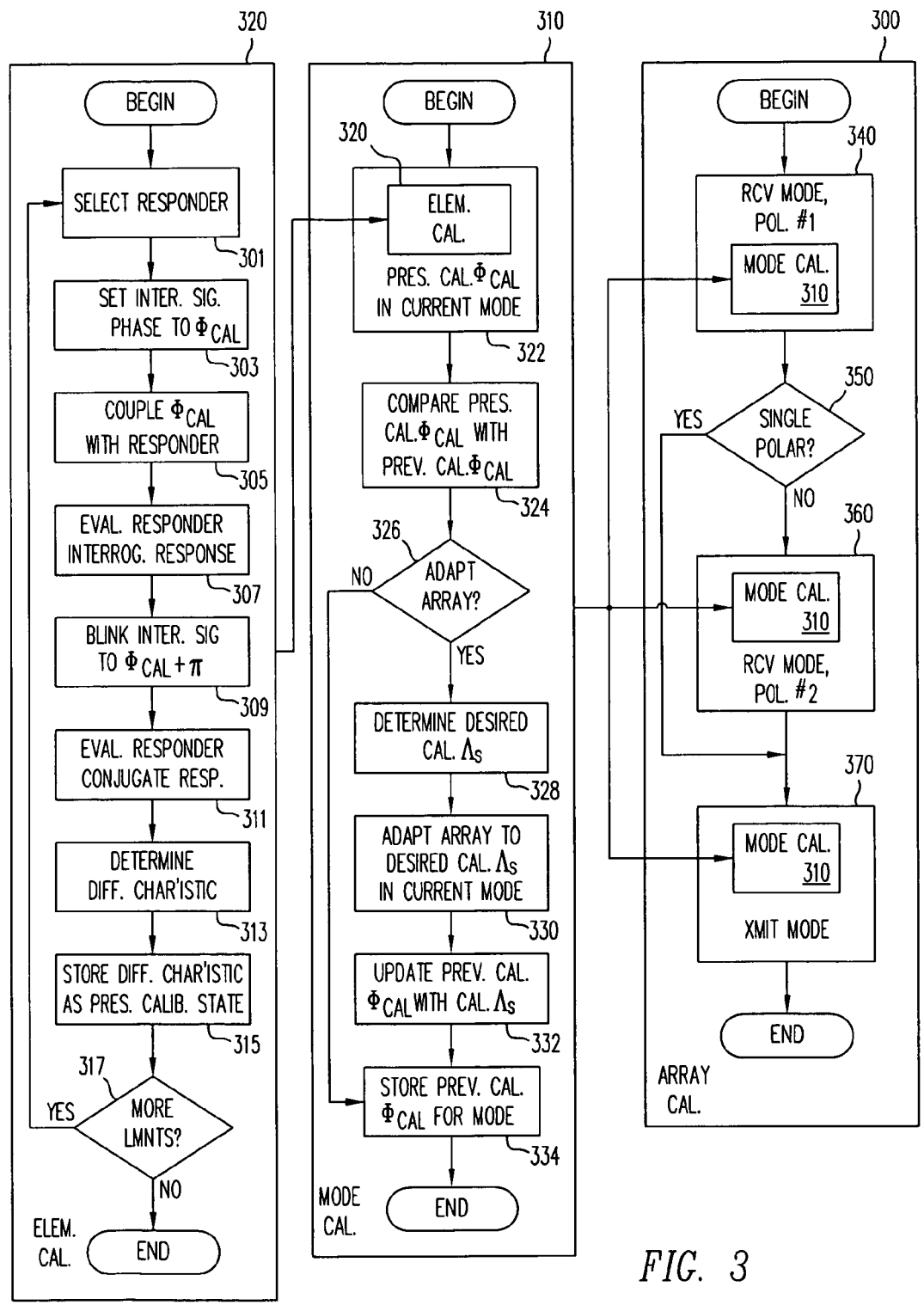
FIG. 3 illustrates a flow diagram corresponding to calibration verification method embodiments of the present invention.

FIG. 3 illustrates an embodiment of an array calibration verification method, generally at 300, according to the invention herein. Array calibration verification method 300 can include mode calibration verification method 310 and element calibration verification method 320. Methods 300, 310, and 320 will be described with respect to elements and examples in FIG. 1 and FIG. 2. Typically, the pertinent previous calibration verification signal phase value $\sphericalangle\Phi_{VER}$ for the respective responder can be selected from a respective value in the previous calibration verification state $\Theta_{k-1}$ corresponding to the particular element and mode of the iteration.

In general, element calibration verification method 320 includes selecting one of respective array elements 120a-120e as a responder (step 301); selecting an interrogator as a transmit interrogator or a receive interrogator, and generating an interrogation signal having a signal phase value approximately equal to a previous calibration verification phase $\sphericalangle\Phi_{VER}$ corresponding to the calibration verification value for mode of operation being determined (step 303); coupling the interrogation signal with the interrogator and the responder, thereby producing an interrogation response signal (step 305); determining the characteristic interrogation response of the responder (step 307); "blinking" the interrogation response signal by rotating the interrogation response signal phase value $\angle\Phi_{VER}$ by about $\pi$ radians (180°) thereby generating a conjugate signal having a signal phase value of $\angle\Phi^*_{VER}$ (step 309); determining the conjugate response of the responder (step 311); determining the responder difference characteristic by combining the responder characteristic interrogation response with the responder characteristic conjugate response (step 313); and storing the responder difference characteristic as representative of the present calibration verification state $\Theta_k$ of the responder, relative to array 105 (step 315).

It is desirable to iterate steps 301-315 of method 320 through selected array elements 120a-120e (step 317), as is desired to obtain a sufficient calibration verification for the current mode of operation (receive, transmit), although it may be advantageous to characterize a subset of array elements 120a-120e, i.e., a subarray of array 105, instead of the entirety of array 105. In general, it is desirable to change calibration verification phase value $\angle\Phi_{VER}$ only when array 105 is adapted to a desired calibration state $\Lambda_s$, resulting in a change of calibration signal phase values.

When initial calibration phase value is determined by traditional boresighting calibration methods, an initial coupling measurement of each element 120a-120e in array 105, such as may be done immediately after boresighting the array. As a result, initial calibration data may be used as previous calibration signal phase data $\angle\Phi_{VER}$ thereafter. It may be desirable to determine the calibration verification state of a phased array in a receive mode of operation before determining the calibration state of a phased array in a transmit mode of operation. Element verification method 320 can be a constituent process step of mode calibration verification method 310, for example, when it is desirable to determine the present calibration verification state (step 322) of array 105 in a particular mode of operation, for example, the receive mode or the transmit mode. In general, by comparing the present calibration verification state $\Theta_k$ of array 105 with a previous calibration verification state $\Theta_{k-1}$ of array 105, the nature and extent of a change in the calibration verification state can be determined, as is illustrated at step 324. If the results of comparing at step 324 indicate the desirability to adapt array 105 (step 326), then method 310 can continue by determining the desired calibration state $\Lambda_s$ (step 328), and by adapting array 105 to be configured in accordance with desired calibration state $\Lambda_s$ (step 330). When array 105 has been adapted to a new calibration state $\Lambda_s$, it is desirable to update calibration verification state history such that $\Theta_{k-1}$ generally reflects $\Lambda_s$ (step 332) Conveniently, mode calibration verification method 310 may include storing data representative of the previous calibration verification state $\Theta_{k-1}$ (step 334), for example, in a data structure such as tables 170a-170c.

In general, array method 300 can invoke mode calibration verification method 310 for verifying the calibration verification state of array 105 in a single-polarization receive mode (step 340), as well as for verifying the calibration verification state of array 105 in a transmit mode (step 370). If array 105 is configured to receive signals oriented in a first signal polarization and in a second signal polarization (step 350), then receive mode verifying can include verifying the calibration verification state of array 105 with received signals oriented in a first polarization (step 340), and verifying the calibration verification state of array 105 with received signals oriented in a second polarization (step 360).

Advantageously, array calibration verification method 300, which may include methods 310 and 320, can be implemented as built-in calibration verification method for an array antenna, including a phased array antenna such as a SAR imaging apparatus deployed on an airborne platform. Built-in array calibration verification methods according to the present invention may be suitably implemented for use at nearly any point during product life. Methods 300, 310, and 320 may employ other well-known array antenna calibration, characterization, or analysis algorithms, in conjunction with methods disclosed herein.

Figure 4:
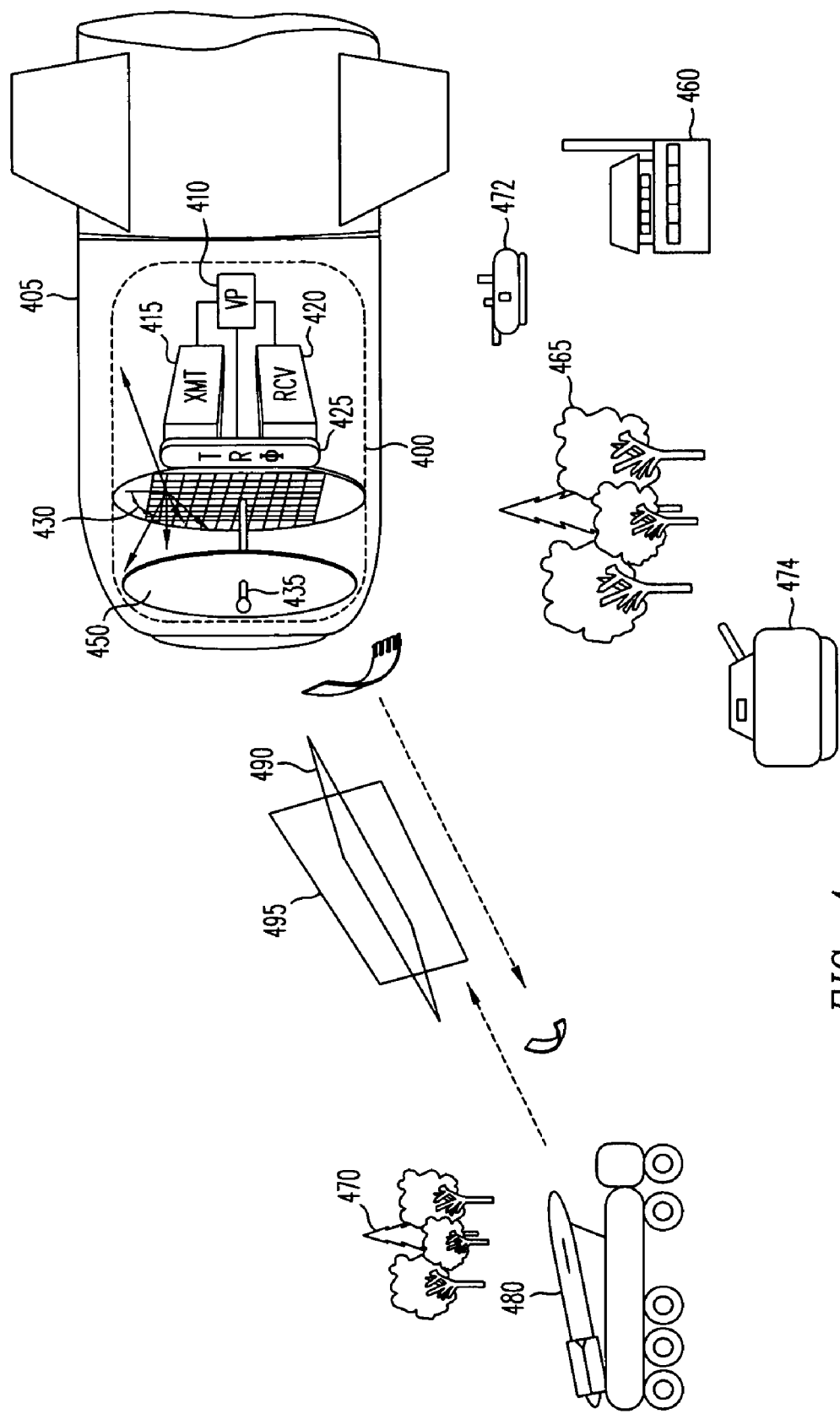
FIG. 4 illustrates a built-in missile radar calibration verification system embodiment of the present invention.

FIG. 4 illustrates an exemplary embodiment of a calibration verification system 400 implemented in the context of an imaging subsystem for seeker missile 405. Seeker missile 405 may include an imaging RADAR, which can operate as a synthetic aperture RADAR when seeking a selected target within some selected geographic region, and as a staredown RADAR, to home in on and impact an identified strike point on the selected target, once located.

System 400 includes verification processor 410 coupled to transmit processor 415 and receive processor 420, as well as array assembly 425, having antenna elements, generally at 430, disposed in a planar array geometry. Array 425 can be coupled to transmit processor 415, receive processor 420, and verification processor 410, and may include array elements similar to array elements 120a-120e such as transmit and receive (T/R) amplification modules, phasers, BIT switches, and other array components (not shown). As in FIG. 1, BIT switches in array assembly 425 can be controlled by processor 410.

In high-resolution applications, such as synthetic aperture RADAR, it may be desirable to reduce mutual coupling of adjacent elements by disposing an impedance matching sheet, such as a wide-angle impedance matching sheet 450, shown at an exaggerated distance from array 425. Although during high-resolution operation, mutual coupling may not be considered to be beneficial, selected calibration verification methods according to the present invention may form an interrogation signal from mutually coupled array element emissions. In configurations of missile 405 using WAIM sheet 450, where mutually-coupled emissions tend to be attenuated, distinct interrogator antenna component 435, for example a monopole antenna, a dipole antenna, a quadrupole antenna, and the like, may be coupled to array 425. Similar to array 105 in FIG. 1, array elements 430 of array 425 in FIG. 4 can include BIT switches (not shown), with a respective BIT switch being coupled to dedicated interrogator antenna component 435 to facilitate configuration as a transmit interrogator or as a receive interrogator.

Initially, array 425 in missile 405 can have the array boresight calibration determined through well-known techniques after which an initial calibration may be performed. The effects of mutual coupling of array 425, pointing at angles sufficiently offset from boresight may be reduced by WAIM sheet 435. It is desirable that the initial (present) calibration verification state to be stored in missile 405, for example, in on-board non-volatile memory. System 400 may be manufactured at a time and location substantially removed from its ultimate theatre of application, may be stored under suboptimal conditions for months, even years, after manufacture and assembly, and may be readied for deployment on short notice. Prior to use, missile 405 may undergo cargo-style handling, and transportation through a global supply chain under rugged circumstances. Even under the best of conditions, it is likely that array element characteristics may change and a portion of array 425 may suffer look direction misorientation, defocusing, or resolution loss, e.g., through physical damage or element failure. Because it may be impractical to perform a complete boresighting and mutual coupling calibration at the time missile 405 is drawn from storage and pressed into service, it may be advantageous to rapidly characterize the present calibration verification state of array 425 relative to a previous calibration verification state, and to adapt array 425 to a desired calibration verification state, if calibration verification indicates a desirability for array adaptation.

In this way, technicians may quickly learn whether immediate deployment of missile 405 may be improvident due to excessive damage, misalignment, or component drift that may have been suffered by array 425. Fortunately, not all deteriorations or impairments render array 425 and missile 405 unserviceable and, using the inventive methods and apparatus of built-in calibration verification described herein, correctable deteriorations or impairments of array 425 can be identified and implemented, such that missile 405 may be deployed successfully. Similarly, it may be desirable to verify the calibration system of array 425 before launch. Where in the form of a surface-to-air missile, missile 405 can be mounted on the frame of a carrier aircraft (not shown) and be brought into a position for launch. For an exemplary air-to-surface missile, a prelaunch period may encompass the moments before missile 405 separates from a carrier aircraft. Such environments can be inherently hostile, and missile 405 may suffer physical jarring or impingement from airborne hazards, shrapnel, or other debris enroute to the launch point, and thermal excursions (e.g., >60° C.) between ground and theatre. Thus, pre-launch, in-the-air calibration verification may be desirable to compensate for correctable influence from hostile factors, and system 400 may perform calibration verification of array 425, for example, using method 300 described with respect to FIG. 3.

After missile 405 is launched, it may proceed to its target using SAR RADAR imaging to track and follow landmarks, 460, 465, 470 to the theatre of operation, as identified by preloaded maps or by real-time intelligence communications to missile 405. A theatre of operations can be inherently hostile, and missile 405 may suffer physical jarring or impingement from airborne hazards, shrapnel, or other debris enroute to its terminal point. It is desirable that system 400 provide in-flight built-in calibration verification of array 425 to continue high-resolution imaging during the terminal portion of the mission of missile 405. High-resolution imaging facilitates accurate identification of desirable targets and avoidance of non-combatant areas, and allows missile 405 to discern a high priority vehicle 480, from lower-priority targets vehicles 472, 474. To assist with such imaging, array 425 may process received signals with two polarizations. Therefore, it may be desirable to verify the receive mode calibration of array 425 for a received signal having a first signal polarization 490 and for a received signal having a second signal polarization 495, as well as verifying the transmit mode calibration of array 425.

Figure 5A:
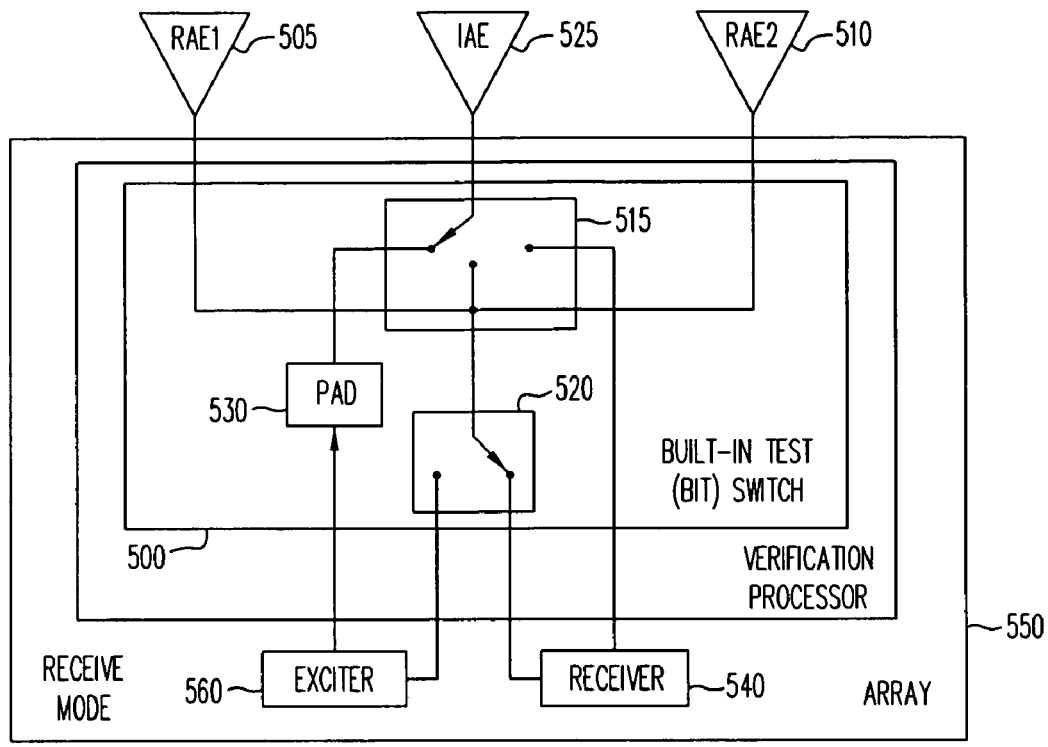
FIG. 5A is schematic illustration of a built-in test switch in a receive mode according to embodiments of the present invention.
Figure 5B:
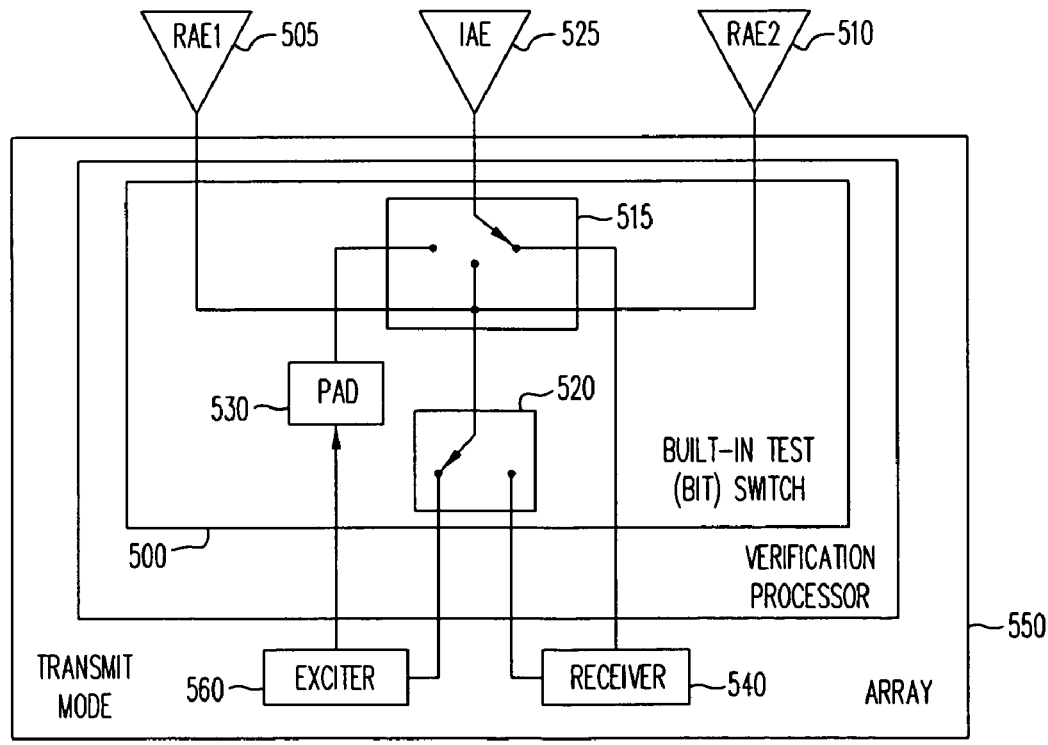
FIG. 5B is schematic illustration of a built-in test switch in a transmit mode according to embodiments of the present invention.

FIGS. 5A and 5B illustrate an exemplary embodiment of built-in test (BIT) switch 500, operating in array RECEIVE and array TRANSMIT modes, respectively. BIT switch 500 may include interrogator mode switch 515, responder mode switch 520, and variable attenuator (PAD) 530 disposed between exciter 560, and interrogator array element (IAE) 525. Switch 515 can select between RECEIVE mode interrogator operation and TRANSMIT mode interrogator operation. Switch 520 can select between RECEIVE mode responder operation and TRANSMIT mode responder operation for responder array element #1 (RAE1) 505 and responder array element #2 (RAE2) 510. When array 550 is operated in the calibration verification RECEIVE mode, IAE 525 can be a transmitter, with RAE1 505 and RAE2 510 serving as receivers. Conversely, when array 550 is operated in the calibration verification TRANSMIT mode, IAE 525 can be a receiver, with RAE1 505 and RAE2 510 serving as transmitters.

In FIG. 5A, array 550 operates in calibration verification RECEIVE mode. Switch 515 can be operated to couple IAE 525 to a transmit signal path to PAD 530 and to exciter 560. Switch 520 can be operated to direct signals received by RAE1 505, RAE2 510 through to receiver 540. In this configuration IAE 525 can couple an interrogation signal with RAE1 505 and RAE2 510, for example, including mutually-coupled emissions. To determine a present calibration verification state of RAE1 505 and RAE2 510, it may be desirable to measure the mutually-coupled received interrogation signal sensed by RAE1 505 and RAE2 510. With the characteristic interrogation responses of RAE1 and RAE2 thus determined, RAE1 can be selected as a responder, for which an interrogation conjugate signal can be rotated 180 degrees by the responder and characteristic conjugate response for responder RAE1 505 can be sensed. The phase angle of RAE1 505 can be returned to the unrotated state, and RAE2 510 can be selected as a responder. As with RAE1 505, a conjugate signal can be formed for RAE2 510 and the characteristic conjugate response for responder RAE2 510 can be sensed. The characteristic responses for RAE1 and RAE2 may be analyzed to determine the present calibration verification state of array 550.

In FIG. 5B, array 550 operates in calibration verification TRANSMIT mode. Switch 515 can be operated to couple IAE 525 to a receive signal path to receiver 540. Switch 520 can be operated to direct a transmit signal from exciter 560 to RAE1 505 and RAE2 510. In this configuration RAE1 505 and RAE2 510 can couple an interrogation signal with IAE 525, for example, including mutually-coupled emissions. To determine a present calibration verification state of RAE1 505 and RAE2 510, it may be desirable to measure the mutually-coupled transmitted interrogation signal sensed by IAE 525. With the characteristic interrogation responses of RAE1 and RAE2 in the TRANSMIT mode thus determined, RAE1 can be selected as a responder, for which an interrogation conjugate signal can be formed and characteristic conjugate response for responder RAE1 505 can be sensed. The phase angle of RAE1 505 can be returned to the unrotated state, and RAE2 510 can be selected as a responder. As with RAE1 505, an interrogation conjugate signal can be formed for RAE2 510 and the characteristic conjugate response for responder RAE2 510 can be sensed. The characteristic responses for RAE1 and RAE2 may be analyzed to determine the present calibration verification state of array 550.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A RADAR calibration verification apparatus for an array antenna having array elements, comprising:
   a responder selected from an array element of the array antenna;
   an interrogator;
   a verification processor coupled to the responder and the interrogator and causing an interrogation signal having a phase angle to be coupled with the responder and the interrogator, wherein the verification processor is configured to cause the phase angle of the interrogation signal to be rotated by about 180 degrees in phase, generating a conjugate signal thereby, wherein the verification processor is adapted to determine a characteristic conjugate response of the responder to the conjugate signal, and wherein the verification processor produces a representation of a present calibration verification state of the array antenna responsive to the characteristic conjugate response.

2. The apparatus of claim 1, wherein the interrogator further comprises a dedicated interrogator distinct from the array elements.

3. The apparatus of claim 1, further comprising:
a transmit processor configured to cause the array elements to transmit a phased array signal; and
a receive processor configured to cause the array elements to receive a phased array signal,
wherein one of the transmit processor and the receive processor is coupled to the verification processor and is adapted to respond to the verification processor by producing a respective mode-related interrogation signal.

4. The apparatus of claim 2, further comprising:
a transmit processor configured to cause the array elements to transmit a phased array signal; and
a receive processor configured to cause the array elements to receive a phased array signal,
wherein one of the transmit processor and the receive processor is coupled to the verification processor and is adapted to respond to the verification processor by producing a respective mode-related interrogation signal.

5. The apparatus of claim 4, wherein the array elements are disposed in a planar geometry, wherein the interrogation signal is selected to verify the calibration of a mode of the array antenna and wherein the verification processor iteratively selects a respective array element as a respective responder and produces a respective difference characteristic of the respective responder representative of a present calibration verification state of the array antenna.

6. The apparatus of claim 5 wherein the RADAR calibration verification apparatus is a built-in RADAR calibration verification apparatus substantially integrated with the array antenna.

7. The apparatus of claim 2, further comprising a memory coupled to the verification processor and adapted to store a representation of a calibration verification state of the array.

8. The apparatus of claim 6, wherein the verification processor and the array antenna are integrable with a missile.

9. A RADAR calibration verification apparatus for an array antenna having array elements, comprising:
a responder selected from an array element of the array antenna;
a dedicated interrogator distinct from the array elements and coupled with the responder by an interrogation signal having a phase angle;
a verification processor coupled to the responder and the interrogator and causing the interrogation signal to be coupled with the responder and the interrogator; and
a memory coupled to the verification processor,
wherein the array elements are disposed in a planar geometry, wherein the interrogation signal is selected to verify the calibration of a mode of the array antenna and wherein the verification processor iteratively selects a respective array element as a respective responder,
wherein the verification processor evokes an interrogation signal corresponding to a mode of the array antenna, wherein the verification processor causes a conjugate signal to be coupled with the responder and the interrogator, wherein the verification processor is adapted to determine a characteristic conjugate response of the responder to the conjugate signal, wherein the verification processor produces a representation of a present calibration verification state of the array antenna and adapts the array antenna responsive thereto, and wherein the calibration verification apparatus is an apparatus built into a missile.

10. The apparatus of claim 9, wherein the mode of the antenna is transmit.

11. The apparatus of claim 10, wherein the mode of the array antenna is receive.

12. The apparatus of claim 11, wherein the verification processor is adapted to determine a difference characteristic of the responder to a received interrogation signal having a first polarity, and a difference characteristic of the responder to a received interrogation signal having a second polarity.

13. The apparatus of claim 9, wherein the verification processor is configured to produce a difference characteristic of the responder representative of a present calibration verification state of the array antenna while the missile is in flight.

14. A method for verifying a calibration verification state of an array antenna having array elements, including a responder and an interrogator, the method for verifying comprising:
selecting the interrogator as one of a transmit interrogator and a receive interrogator corresponding to a respective array antenna mode;
iteratively selecting one of the respective array elements as the responder;
iteratively generating an interrogation signal having a signal phase value approximately equal to a previous calibration signal phase value $\Phi_{CAL}(t-1)$ corresponding to the respective array element being the responder and the respective array antenna mode;
iteratively coupling the responder and the interrogator with the interrogation signal;
iteratively determining a responder interrogation response;
iteratively rotating the interrogation signal phase value by about $\pi$ radians thereby generating a conjugate signal having a signal phase value of $\Phi_{CAL}(t-1)+\pi$;
iteratively coupling the conjugate signal with the responder;
iteratively determining a responder conjugate response;
iteratively determining a representative present calibration verification state of the array antenna from the responder interrogation response and the responder conjugate response; and
iteratively storing the representative present calibration verification state of the array antenna as a previous calibration verification state of the array antenna.

15. The method of claim 14, further comprising:
adapting the array antenna calibration responsive to the representative present calibration verification state of the array antenna relative to the previous calibration verification state of the array antenna.

16. The method of claim 14, further comprising: determining a representative present calibration verification state of the array antenna disposed in a missile-in-flight, and adapting the array antenna calibration responsive to the representative present calibration verification state of the array antenna relative to the previous calibration verification state of the array antenna.

17. The method of claim 14, further comprising:
- determining a first representative present calibration verification state of the array antenna operating in a receive mode for an interrogation signal having a first signal polarization;
- determining a second representative present calibration verification state of the array antenna operating in a receive mode for an interrogation signal having a second signal polarization;
- determining a third representative present calibration verification state of the array antenna operating in a transmit mode;
- determining a calibration verification state variance of the array antenna by calculating a statistical variance from at least one of the first, second, and third representative present calibration verification states relative to a respective previous calibration verification state; and
- adapting the array antenna calibration responsive to the calibration verification state variance of the array antenna.

18. The method of claim 16, further comprising:
- determining a first representative present calibration verification state of the array antenna operating in a receive mode for an interrogation signal having a first signal polarization;
- determining a second representative present calibration verification state of the array antenna operating in a receive mode for an interrogation signal having a second signal polarization;
- determining a third representative present calibration verification state of the array antenna operating a transmit mode;
- determining a calibration verification state variance of the array antenna from at least one of the first, second, and third representative present calibration verification state relative to a respective previous calibration verification state; and
- adapting the array antenna calibration responsive to the calibration verification state variance of the array antenna.

19. In a phased array antenna including respective array elements with each respective array element having a respective phase shifter coupled thereto, a method for verifying the calibration of the phased array antenna, comprising:
- coupling an interrogation signal corresponding to one of a transmit mode and a receive mode with the respective array elements, wherein a phase angle of the interrogation signal is approximately equal to a previous calibration phase angle;
- responsive to the interrogation signal, detecting in the respective array element a respective sensed signal having a respective sensed array element phase;
- activating the respective phase shifter to produce from the respective sensed signal a respective conjugate signal having a respective conjugate element phase substantially phase-reversed relative the respective sensed array element phase;
- sensing the respective conjugate signal in the respective array element;
- combining the respective sensed signal and the respective conjugate signal to generate a respective difference characteristic corresponding to the respective array element; and
- adapting the respective array element in accordance with the respective difference characteristic.

20. The method of claim 19, wherein coupling the interrogation signal further comprises coupling the interrogation signal from a dedicated interrogator coupled to the array antenna.

21. The method of claim 20, wherein the method performs a built-in missile radar calibration verification test performed onboard a missile in which the phased array is disposed.

* * * * *